(12) United States Patent
Onuma et al.

(10) Patent No.: US 9,507,077 B2
(45) Date of Patent: Nov. 29, 2016

(54) RESIN COMPOSITION FOR LIGHT GUIDE ARTICLE-PREFORM, LIGHT GUIDE ARTICLE-PREFORM, LAMINATED LIGHT GUIDE ARTICLE-PREFORM, LIGHT GUIDE ARTICLE FOR SURFACE LIGHT SOURCE DEVICE AND SURFACE LIGHT SOURCE DEVICE

(71) Applicant: MITSUBISHI RAYON CO., LTD., Tokyo (JP)

(72) Inventors: Fumiko Onuma, Aichi (JP); Minoru Shimizu, Kanagawa (JP); Kenji Yagi, Kanagawa (JP); Tomoyoshi Yamashita, Hiroshima (JP); Youhei Sechi, Toyama (JP); Yoshiya Kurachi, Kanagawa (JP); Shinji Saiki, Hiroshima (JP)

(73) Assignee: MITSUBISHI RAYON CO., LTD., Tokyo (JP)

( * ) Notice: Subject to any disclaimer, the term of this patent is extended or adjusted under 35 U.S.C. 154(b) by 161 days.

(21) Appl. No.: 14/409,478

(22) PCT Filed: Jun. 5, 2013

(86) PCT No.: PCT/JP2013/065536
§ 371 (c)(1),
(2) Date: Dec. 19, 2014

(87) PCT Pub. No.: WO2013/190996
PCT Pub. Date: Dec. 27, 2013

(65) Prior Publication Data
US 2015/0338568 A1 Nov. 26, 2015

(30) Foreign Application Priority Data

Jun. 22, 2012 (JP) ................................. 2012-140662
Jun. 28, 2012 (JP) ................................. 2012-145680

(51) Int. Cl.
*F21V 8/00* (2006.01)
*C08L 33/12* (2006.01)
(Continued)

(52) U.S. Cl.
CPC ............ *G02B 6/0065* (2013.01); *B29C 44/06* (2013.01); *B29D 11/00721* (2013.01);
(Continued)

(58) Field of Classification Search
CPC ... C08L 33/12; C08L 83/00; B29D 11/00721
See application file for complete search history.

(56) References Cited

U.S. PATENT DOCUMENTS

2006/0210903 A1* 9/2006 Ohki .................... G03G 9/0804
                                                          430/109.4
2008/0266493 A1* 10/2008 Yonezawa ............... C08L 25/10
                                                          349/96

(Continued)

FOREIGN PATENT DOCUMENTS

| JP | 2006-241263 | 9/2006 |
|----|-------------|--------|
| JP | 2012-009160 | 1/2012 |
| WO | 2008/026373 | 3/2008 |

OTHER PUBLICATIONS

"International Search Report (Form PCT/ISA/210)", mailed on Jul. 16, 2013, pp. 1-2.

*Primary Examiner* — Elmito Breval
(74) *Attorney, Agent, or Firm* — Jianq Chyun IP Office

(57) ABSTRACT

A resin composition for a light guide article-preform is described, which enables the formation of a foamed layer having a large light scattering effect on the surface of a shaped article by laser irradiation processing at low cost. More specifically, the present invention relates to: a resin composition for a light guide article-preform, which contains a resin having a mass average molecular weight of 60,000 to 150,000, and has a 30% thermal mass reduction temperature of 310° C. or lower and a difference between a 40% thermal mass reduction temperature and a 20% thermal mass reduction temperature of 7° C. or less when a thermal mass measurement is performed with starting from the state at 100° C. under air at a temperature rising rate of 5° C./min.

17 Claims, 4 Drawing Sheets

(51) Int. Cl.
  *B29D 11/00* (2006.01)
  *B29C 44/06* (2006.01)
  *G02B 1/04* (2006.01)

(52) U.S. Cl.
  CPC .............. *C08L 33/12* (2013.01); *G02B 1/045* (2013.01); *G02B 6/0036* (2013.01); *G02B 6/0066* (2013.01); *C08L 2203/20* (2013.01)

(56) References Cited

U.S. PATENT DOCUMENTS

2009/0030134 A1\* 1/2009 Sasaki .................. C01B 13/322
  524/493
2009/0123642 A1\* 5/2009 Sato .................. C08G 59/5086
  427/98.5

\* cited by examiner

RESIN COMPOSITION FOR LIGHT GUIDE ARTICLE-PREFORM, LIGHT GUIDE ARTICLE-PREFORM, LAMINATED LIGHT GUIDE ARTICLE-PREFORM, LIGHT GUIDE ARTICLE FOR SURFACE LIGHT SOURCE DEVICE AND SURFACE LIGHT SOURCE DEVICE

CROSS-REFERENCE TO RELATED APPLICATION

This application is a 371 application of an international PCT application serial no. PCT/JP2013/065536, filed on Jun. 5, 2013, which claims the priority benefit of Japan application no. 2012-140662, filed on Jun. 22, 2012, and Japan application no. 2012-145680, filed on Jun. 28, 2012. The entirety of each of the above- mentioned patent applications is hereby incorporated by reference herein and made a part of this specification.

TECHNICAL FIELD

The present invention relates to a resin composition for a light guide shaped article-preform, a light guide shaped article-preform, a laminated light guide shaped article-preform, a light guide article for an surface light source device, and a surface light source device.

BACKGROUND ART

As a backlight arranged on a back surface of a liquid crystal panel used for a liquid crystal display apparatus, an edge-lighting type backlight is widely used in terms of compactness of the liquid crystal display apparatus.

In the edge-lighting type backlight, at least one end surface of a light guide sheet having a rectangular shape is used as a light incident end surface. Adjacent to the light incident end surface, a line-shaped primary light source such as a straight tube fluorescent lamp or a dot-shaped primary light source such as a light emitting diode (LED) is arranged along the light incident end surface. The light emitted from the primary light source enters from the light incident end surface of the light guide sheet, and after that, the light is introduced into the light guide sheet. The light is emitted from the light emitting surface of the one of two principal surfaces of the light guide sheet. The light emitted from the light emitting surface of the light guide sheet is diffused with a light diffusing element such as a light diffusing film and a light deflecting element such as a prism sheet, which are arranged on the light emitting surface to be deflected in the required direction.

On the back surface of the other principal surface of the two principal surfaces of the light guide sheet, a light reflecting element such as a light reflecting sheet is arranged to face the back surface in order to return the light emitted from the back surface to the light guide sheet.

On the light emitting surface of the light guide article or the back surface thereof, a light emitting organization having a function for emitting light is formed. For the light emitting organization, for example, it may be used a micro-concave-convex structure such as a rough surface which is moderately roughened or a lens-line forming surface where many lens-lines are arranged.

As a method of forming such a micro-concave-convex structure, for example, it may be exemplified a method of molding a resin shaped-article with use of a molding apparatus using a mold member for molding where concave-convex shapes are formed on the surface with blasting, cutting or the like, and transferring the concave-convex shapes to the surface of the resin shaped-article and a method of forming a foamed layer on a surface of the resin shaped-article.

For example, Patent Document 1 discloses a method of forming a foamed surface layer on a principal surface of a sheet-shaped light guide article-preform which is obtained with a methacrylic resin having a high molecular mass produced with cast polymerization with use of a laser irradiation processing.

In addition, Patent Document 2 discloses a method of irradiation by laser after impregnating a thermoplastic resin shaped-article with carbon dioxide and/or nitrogen.

CITATION LIST

Patent Document

Patent Document 1: JP 2012-9160 A
Patent Document 2: WO 2008/026373 A

DISCLOSURE OF THE INVENTION

Problem to be Solved by the Invention

However, the technique of Patent Document 1 has a problem in that it may not be possible to obtain a light guide article having a good light scattering effect because a foamed layer may not be formed on the surface of the shaped product with use of the acrylic resin which is suitable for extrusion molding or injection molding despite the surface-foamed layer may be formed on the principal surface of the sheet-shaped light guide shaped article-preform using the acrylic resin obtained with the cast polymerization.

In addition, the technique of Patent Document 2 has a problem of causing a high cost because a process of impregnating with the carbon dioxide and/or nitrogen is necessary before the laser irradiation.

The present invention is in order to solve the problems of the related art, and is to provide a resin composition for a light guide shaped article-preform capable of forming a foamed layer with respect to an acrylic resin having a good moldability with use of a laser irradiation processing and forming a good light scattering pattern at a low cost.

Means for Solving Problem

The aforementioned problems are solved by the following inventions [1] to [17].

[1] A resin composition for a light guide shaped article-preform containing a resin having a mass average molecular mass of 60,000 to 150,000, and having a 30% thermal mass reduction temperature of 310° C. or lower and a difference of 7° C. or lower between a 40% thermal mass reduction temperature and a 20% thermal mass reduction temperature when thermal mass measurement is performed with a temperature rising rate of 5° C./min from the state of 100° C. under air.

[2] The resin composition for a light guide shaped article-preform according to [1], wherein a peak temperature of a maximum peak among peaks, representing a mass-to-charge ratio m/z of 100, is 310° C. or lower, and a half extent temperature of the peak of the maximum peak is 25° C. or lower, when mass spectrometry is performed with an ionization method using light energy for a material being generated at the time of heating with a temperature rising rate of 5° C./min from the state of 40° C. under a pseudo air stream containing 80 mass % of helium and 20 mass % of oxygen.

[3] A resin composition for a light guide shaped article-preform containing a resin having a mass average molecular mass of 60,000 to 150,000, and a silicone compound having a 90% thermal mass reduction temperature of 250° C. or higher and 650° C. or lower when thermal mass measurement is performed at a temperature rising rate of 5° C./min from the state of 100° C. under nitrogen.

[4] The resin composition for a light guide shaped article-preform according to [3], wherein the silicone compound is dimethyl silicone oil.

[5] The resin composition for a light guide shaped article-preform according to any one of [1] to [4], wherein the resin is a polymer containing 30 to 100 mass % of methyl methacrylate units and 0 to 70 mass % of other monomer units.

[6] A light guide shaped article-preform which is a sheet obtained from the resin composition for a light guide shaped article-preform according to any one of [1] to [5].

[7] A laminated light guide shaped article-preform which is a laminate obtained with lamination of the light guide shaped article-preform according to [6] on a different translucent sheet.

[8] The light guide shaped article-preform according to [6] which is a sheet obtained with shaping by extrusion molding or injection molding using the resin composition for the light guide shaped article-preform.

[9] The laminated light guide shaped article-preform according to [7], wherein the light guide shaped article-preform is a sheet obtained with shaping by extrusion molding or injection molding using the resin composition for the light guide shaped article-preform.

[10] A light guide article for a surface light source device, in which at least one end surface of the light guide shaped article-preform according to [6] or [8] is used as a light-incident end-surface, the one of two principal surfaces of the light guide shaped article-preform is used as a light emitting surface and the other principal surface is used as a back surface, wherein a bubble-containing surface layer is formed on a partial area or the entire area of the light emitting surface or the back surface.

[11] A light guide article for a surface light source device, in which at least one end surface of the light guide shaped article-preform constituting the laminated light guide shaped article-preform according to [7] or [9] is used as a light incident end surface and a principal surface of the light guide shaped article-preform side or a principal surface of the translucent sheet side among two principal surfaces of the laminated light guide shaped article-preform is used as a light emitting surface, wherein a bubble-containing surface layer is formed on a partial area or the entire area of the principal surface of the light guide shaped article-preform side.

[12] The light guide article for a surface light source device according to [10] or [11], wherein a thickness of the surface layer is in a range of 1 to 50 μm.

[13] The light guide article for a surface light source device according to any one of claims [10 to 12], wherein the surface layer has a concave shape in a cross section including the normal direction of the light emitting surface or the back surface.

[14] The light guide article for a surface light source device according to any one of claims [10]to [13], wherein the surface layer is formed with a laser irradiation processing.

[15] The light guide article for a surface light source device according to [14], wherein a laser used for the laser irradiation processing is an infrared laser.

[16] The light guide article for a surface light source device according to [15], wherein the infrared laser is a carbon dioxide laser.

[17] A surface light source device in which a primary light source is arranged to be adjacent to the light incident end surface of the light guide article for a surface light source device according to any one of [10] to [16].

Effect of the Invention

According to the present invention, it is possible to form a foamed layer having a large light scattering effect on a surface of a shaped article at a low cost with use of a laser irradiation processing, and thus it is suitable as a light guide sheet of a liquid crystal display apparatus or the like.

MODE(S) FOR CARRYING OUT THE INVENTION

Resin

Figure 1:
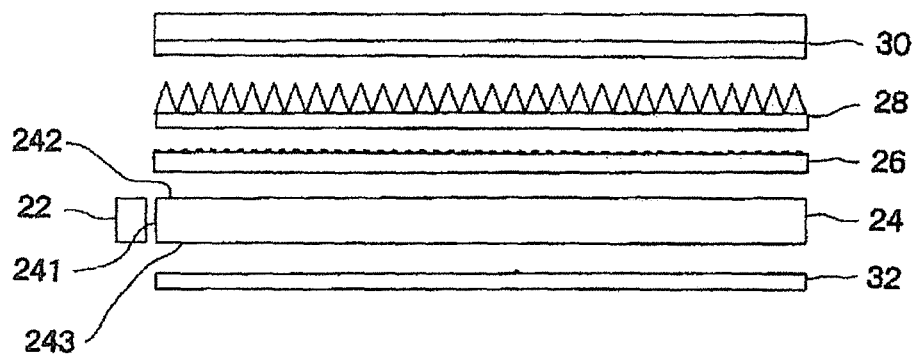
FIG. 1 shows a schematic configuration diagram illustrating an embodiment of a surface light source device according to the present invention.

A resin used in the present invention (hereinafter, referred to as a "present resin") is contained in a resin composition for a light guide article of the present invention (hereinafter, referred to as a "present resin composition").

A mass average molecular mass (hereinafter, denoted by "Mw") of the present resin is in a range of 60,000 to 150,000. When the Mw is set to be in a range of 60,000 to 150,000, a good moldability in extrusion molding or injection molding may be obtained. It is preferable that the upper limit of the Mw be 100,000 or less.

As the present resin, for example, a methyl methacrylate homopolymer or a copolymer of a monomer mixture containing methyl methacrylate as a main component may be exemplified. Among them, it is preferred a polymer containing 30 to 100 mass % of methyl methacrylate units and 0 to 70 mass % of other monomer units. When methyl methacrylate units are set to 30 mass % or more, transparency of the resulting light guide article tends to be improved.

As other monomers, for example, it may be exemplified methacrylic acid esters such as ethyl methacrylate, n-propyl methacrylate, iso-propyl methacrylate, n-butyl methacrylate, iso-butyl methacrylate, tert-butyl methacrylate, cyclohexyl methacrylate, 2-ethylhexyl methacrylate and benzyl methacrylate, acrylic acid esters such as methyl acrylate, ethyl acrylate, n-propyl acrylate, iso-propyl acrylate, n-butyl acrylate, iso-butyl acrylate, tert-butyl acrylate, cyclohexyl acrylate, 2-ethylhexyl acrylate and benzyl acrylate, and aromatic vinyl monomers such as styrene and α-methyl styrene. In addition, other monomers may be used alone or in combination of two or more thereof.

Present Resin Composition

A first present resin composition contains a resin having a mass average molecular mass of 60,000 to 150,000 and has a 30% thermal mass reduction temperature of 310° C. or lower and a difference of 7° C. or lower between a 40% thermal mass reduction temperature and a 20% thermal mass reduction temperature when thermal mass measurement is performed from the state of 100° C. at a temperature rising rate of 5° C./min from the state of 100° C. under air. When the present resin composition has the 30% thermal mass reduction temperature of 310° C. or lower, and the difference of 7° C. or lower between the 40% thermal mass reduction temperature and the 20% thermal mass reduction temperature, it is improved a laser foaming-ability of a shaped article (hereinafter, referred to as a "present shaped article") such as the light guide shaped article-preform (hereinafter, referred to as the "present light guide shaped article-preform") which is a sheet obtained from the present resin composition.

In terms of moldability of a surface foamed layer of the present shaped article with use of a laser irradiation processing, it is preferable that the first present resin composition have a peak temperature of 310° C. or lower of a maximum peak among peaks representing a mass-to-charge ratio m/z of 100 at the time of performing mass spectrometry with an ionization method using light energy for a material being generated at the time of heating on the surface of the present shaped article at a temperature rising rate of 5° C./min from the state of 40° C. under a pseudo air stream containing 80 mass % of helium and 20 mass % of oxygen, and have a half extent temperature of the peak of the maximum peak of 25° C. or lower.

When it is used the present resin composition where the peak temperature of the m/z of 100 and the half extent temperature of the peak of the peak temperature satisfy the aforementioned conditions, the foaming-ability of the surface of the present light guide shaped article-preform tends to be improved with use of a laser irradiation processing, and the light scattering property tends to be improved.

In order to provide a good light scattering property to the surface of the present light guide shaped article-preform with use of the laser irradiation processing, a foamed layer with many foams needs to be formed on the surface of the present light guide shaped article-preform with use of the laser irradiation. Therefore, when it is used the present shaped article where a better foamed layer is able to be foamed, a larger amount of the decomposition product-gas of the present light guide shaped article-preform is generated during the laser irradiation processing.

In the present invention, in a case where it is used the polymer containing 30 to 100 mass % of methyl methacrylate units and 0 to 70 mass % of other monomer units as the resin contained in the present resin composition, the state of formation of the foamed layer on the surface of the present light guide shaped article-preform may be determined with evaluation of the state of detection of the component of mass-to-charge ratio m/z of 100 representing the methyl methacrylate component as the decomposition product-gas component of the present resin composition.

In the present invention, it is preferable that the peak temperature of the m/z of 100 be 200° C. or higher in terms of generation of the decomposition product-gas during the laser irradiation processing. In addition, it is preferable that the half extent temperature of the peak of the peak temperature be 1° C. or higher in terms of a laser workability.

In the present invention, the half extent temperature of the peak of the peak temperature denotes a value representing a temperature range where the detection amount becomes 50% or more of the maximum detection amount at the maximum peak among the peaks representing the mass-to-charge ratio m/z of 100.

As the first present resin composition, for example, it may be exemplified a resin composition where the content of the present resin is 50 mass % or more and 100 mass % or less. However, it may be used a resin composition containing 0.0001 to 1 parts by mass, preferably, 0.0001 to 0.5 parts by mass of a thermal decomposition accelerator with respect to 100 parts by mass of the present resin.

As the thermal decomposition accelerator, for example, it is preferred a silicone compound (hereinafter, referred to as a "present silicone compound") having a 90% thermal mass reduction temperature of 250° C. or higher and 650° C. or lower when thermal mass measurement is performed at a temperature rising rate of 5° C./min from the state of 100° C. under nitrogen. When the present silicone compound is contained in the first present resin composition, the laser foamability tends to be improved.

As the present silicone compound, for example, dimethyl silicone oil may be exemplified.

As a specific example of the present silicone compound, SH200C FLUID 100CS (product name) produced by Dow Corning Toray Co., Ltd., KF96A-30CS (product name) produced by Shin-Etsu Chemical Co., Ltd. and the like may be exemplified.

It is preferable that the content of the present silicone compound in the first present resin composition be 10,000 ppm by mass or less. When the content of the present silicone compound is 10,000 ppm by mass or less, the transparency of the present shaped-article tends to be improved. In addition, it is preferable that the content of the present silicone compound in the present resin composition be 50 ppm by mass or more. When the content of the present silicone compound is 50 ppm by mass or more, there tend to be obtained foams enough to scatter light on the surface of the present shaped article.

In addition, a second present resin composition contains a resin having a mass average molecular mass of 60,000 to 150,000 and a silicone compound having a 90% thermal mass reduction temperature of 250° C. or higher and 650° C. or lower when thermal mass measurement is performed at a temperature rising rate of 5° C./min from the state of 100° C. under nitrogen. When the present silicone compound is contained in the second present resin composition, the laser foamability of the present shaped-article is improved.

In addition, the silicone compound used in the second present resin composition is the same as the silicone compound described in the first present resin composition, and the content in the same range as the first present resin composition is also suitable.

In addition, in the second present resin composition, the content of the present silicone compound with respect to 100 parts by mass of the present resin is preferably 0.0001 to 1 parts by mass, and more preferably 0.0001 to 0.5 parts by mass.

Various additives such as ultraviolet absorbers, mold releasing agents and antioxidants may be added to the first and second present resin compositions (hereinafter, simply referred to as "present resin compositions") as necessary.

As the ultraviolet absorber, for example, it may be exemplified a benzotriazole-based ultraviolet absorber such as 2-(5-methyl-2-hydroxyphenyl)benzotriazole, 2-[2-hydroxy-3,5-bis($\alpha,\alpha'$-dimethylbenzyl)phenyl]benzotriazole or 2-(3, 5-di-t-amyl-2-hydroxy phenyl)benzotriazole, a benzophenone-based ultraviolet absorber such as 2-hydroxy-4-methoxy benzophenone, 2,2'-dihydroxy-4-methoxy benzophenone or 2-hydroxy-4-n-octoxy benzophenone, and a salicylic acid-based ultraviolet absorber such as phenyl salicylate or 4-t-butylphenyl salicylate. These agents may be used alone or in combination of two or more thereof.

As the mold releasing agent, for example, it may be exemplified glycerin fatty acid ester such as glycerin monostearate, a higher alcohol such as stearyl alcohol and a higher fatty acid such as stearic acid. These agents may be used alone or in combination of two or more thereof.

As the antioxidants, for example, phenolic antioxidants, thioether antioxidants and phosphite antioxidants may be exemplified. These agents may be used alone or in combination of two or more thereof.

In addition, the present resin composition may be prepared with mixing, for example, the present resin and various additives which are suitably selected as necessary.

In the mass spectrometry of the present resin composition, for example, a thermal mass spectrometer (TG: Thermogravimeter) and a differential thermogravimetric mass simultaneous measurement apparatus (TG/DTA) may be used for heating the present resin composition.

Materials generated at the time of heating the present resin composition under the aforementioned conditions are decomposition products of the present resin composition.

As the decomposition products, for example, monomer components that are raw materials of the resin used for the present resin composition, carbon dioxide, and water may be exemplified.

In the present invention, in the case of measuring the peak temperature of the component of mass-to-charge ratio m/z of 100 and the half extent temperature of the peak, the above-described decomposition products are rapidly introduced into a mass spectrometer (MS).

In the present invention, in terms of suppression of adsorption of the decomposition product of the present resin composition at the interface connecting the thermal mass spectrometer which generates the decomposition product of the present resin composition and the mass spectrometer, the connecting distance between the thermal mass spectrometer and the mass spectrometer is preferably as short as possible, and an integrated system of the thermal mass spectrometer and the mass spectrometer like Thermo Mass Photo (product name) produced by Rigaku Corporation is preferably used.

In the integrated system of the thermal mass spectrometer and the mass spectrometer, the decomposition product gas generated due to heating of the sample in the thermal mass spectrometer is moved to the ionization chamber of the mass spectrometer and light is irradiated on the decomposition product gas, so that the photoionization is performed. The generated ions are separated with the ion separating means according to the mass-to-charge ratio and detected with the ion detecting means, so that the ion strength is obtained with respect to each of the mass-to-charge ratio.

In the present invention, the mass spectrometry of the present resin composition is performed with a photoionization (PI) method using light energy.

The photoionization method is a method of ionizing molecules by absorption of electromagnetic wave energy of light when the light is irradiated on the decomposition product gas. Since the ionization energy is lower than that of an electron impact ionization (EI) method of ionizing sample-molecules by exerting impact on the sample molecules with use of an acceleration voltage, the photoionization method is preferred in terms that decomposition of the decomposition product gas or fragment ionization does not easily occurs.

In the present invention, in terms of suitability for the ionization of the component of mass-to-charge ratio m/z of 100, ultraviolet light (wavelength of 10 to 380 nm) is preferred as the light used for the ionization.

As the light source, a deuterium lamp (121.567 nm, h=10.2 eV) is preferred.

As the mass spectrometer used in the present invention, for example, it may be used a mass spectrometer composed with an ionization unit which ionizes the above-described gas, an ion-separation unit which separates generated ions according to the mass-to-charge ratio and an ion-detection unit which detects an ion strength.

As an ion-separating means in the ion-separation unit, for example, it may be used various ion-separation methods such as (1) a quadrupole-separation method of separating ions while changing a frequency of a high frequency voltage applied to a quadrupole, (2) an electric field method of separating ions with passing the ions through an electric field and a magnetic field, (3) a time-of-flight method of separating the ions according to a difference in time to reach a detector with allowing ions to fly by exerting a predetermined force on the ions and (4) an ion—trap method with application of a quadrupole.

Light Guide Shaped Article-Preform

A light guide shaped article-preform (hereinafter, referred to as a "present light guide shaped article-preform") according to the present invention is a sheet obtained from the present resin composition. In addition, in the present invention, the sheet has a thickness of 50 μm or more and 30 mm or less.

After the sheet is obtained with use of the present resin composition, the present light guide shaped article-preform having desired dimensions may be obtained with cutting the sheet in a desired size.

In the present invention, it may be used a shaped-article with a shape of sheet which is obtained from the present resin composition.

During the cutting of the sheet, the cut end surface may be processed into a mirror surface.

As the cutting method, for example, methods using a running saw, a panel saw and laser light may be exemplified.

For forming a mirror surface on the cut end surface, it may be used a well-known method such as a polishing method using a sand paper, a polishing method using a well-known polishing agent such as alumina, or a method of rotating and contacting a diamond blade to the cut end surface with PLA-BEAUTY produced by Megaro Technica Co., Ltd.

As the method of shaping the present resin composition on the sheet, for example, an extrusion molding method, an injection molding method, and a thermal press molding method may be exemplified.

The present light guide shaped article-preform may be obtained with use of the following method, for example.

First, a pellet of the present resin composition is obtained. As the method of manufacturing the pellet, for example, it may be exemplified a method to obtain a pellet by loading the present resin composition, which is obtained with polymerization of a dispersion of a raw material containing monomers for obtaining the present resin, and a thermal decomposition accelerator into an extruder, and a method to obtain a pellet by loading a mixture of the present resin and a thermal decomposition accelerator into an extruder.

Next, a sheet of light guide shaped article-preform is obtained with performing a shaping method such as injection molding, extrusion shaping or thermal press shaping with use of the resulting pellet.

Laminated Light Guide Shaped Article-Preform

A laminated light guide shaped article-preform (hereinafter, referred to as a "present laminated light guide shaped article-preform") according to the present invention is a laminated article where the present light guide shaped article-preform is laminated on a different translucent sheet.

The different translucent sheet is a translucent sheet which is different from the present light guide shaped article-preform, and for example, it may be exemplified a sheet of a translucent resin such as a methacrylic resin, a polycarbonate resin, polystyrene, a styrene-containing resin such as an MS resin (methyl methacrylate/styrene copolymer resin) or the like.

As the method of manufacturing the present laminated light guide shaped article-preform, for example, it may be exemplified a method of shaping into a sheet with simultaneously extruding a pellet of the present resin composition and a resin used as a raw material of a translucent sheet, and a method of shaping a laminate with performing thermal press shaping of the present light guide shaped article-preform and a translucent sheet.

Light Guide Article for Surface Light Source Device and Surface Light Source Device Next, embodiments of a light guide article for a surface light source device and a surface light source device according to the present invention will be described.

Figure 2:
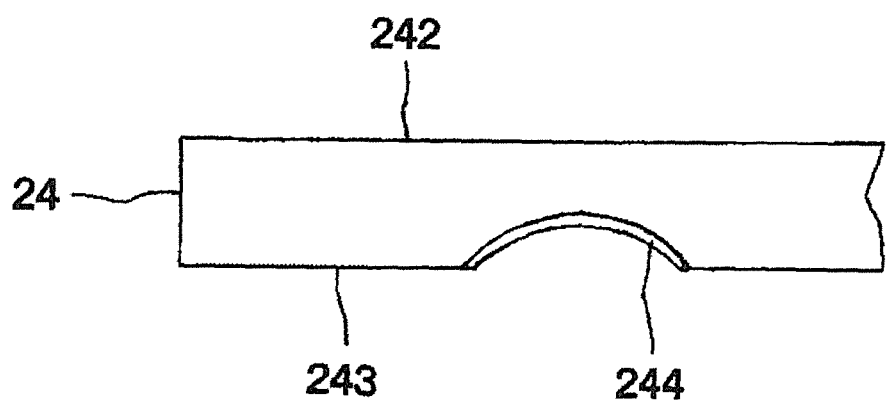
FIG. 2 shows a schematic partial cross-sectional diagram illustrating a light guide article in the surface light source device of FIG. 1.

FIG. 1 is a schematic configuration diagram illustrating an embodiment of a surface light source device according to the present invention, and FIG. 2 is a schematic partial cross-sectional diagram illustrating a light guide article in the surface light source device.

A processing using laser irradiation (laser irradiation processing) is performed on the principal surface (principal surface which is an exposed surface of the light guide shaped article-preform constituting the laminated light guide shaped article-preform in a case where the light guide shaped article-preform is the laminated light guide shaped article-preform) of the light guide shaped article-preform obtained in the above-described manner, so that a bubble-containing surface layer 244 illustrated in FIG. 2 is formed on the surface layer portion of the principal surface of the light guide shaped article-preform which is obtained with the resin composition for the light guide shaped article-preform.

As the laser used for the laser irradiation processing, it is preferably used a laser having a good processing efficiency with respect to the surface layer portion, which is obtained with the resin composition for the light guide shaped article-preform, of the light guide shaped article-preform. For example, an infrared laser such as a carbon dioxide laser ($CO_2$ laser) is used, and the wavelength is, for example, 9.3 μm or 10.6 μm. When the infrared laser is used, the light guide shaped article-preform efficiently absorbs the irradiated laser light and the absorbing portion is heated, so that an efficient laser irradiation processing may be performed.

As the carbon dioxide laser irradiation processing apparatus, a $CO_2$ laser marker ML-Z9520T (wavelength: 9.3 μm, average power: 20 W) produced by Keyence Corporation may be exemplified.

The longitudinal cross sectional shape (profile) of the bubble-containing surface layer 244 may be easily changed with changing laser power, a scan speed or a focus position of the laser irradiation to the principal surface of the light guide shaped article-preform.

As illustrated in FIG. 1, a surface light source device according to the embodiment is composed of an LED 22 as a dot-shaped primary light source, a line-shaped light guide article 24 which guides light emitted from the LED, a light diffusing element 26, a first light deflecting element 28, a second light deflecting element 30 and a light reflecting element 32.

The light guide article 24 has the up/down direction in FIGS. 1 and 2, as the thickness direction, and has extension in the direction vertical to the paper surface, so that the light guide article 24 has a rectangular sheet shape as a whole. The light guide article 24 has four side end surfaces, and the one side end surface of one pair of the side end surfaces thereof is used as a light incident end surface 241, so that the LED 22 is arranged to be adjacent so as to face the light incident end surface 241. In addition, the light guide article 24 has one light incident end surface 241 in the embodiment, however, since at least one end surface may be the light incident end surface, the present invention is not limited thereto because at least one end surface may be the light incident end surface, and both of a desired one pair of side end surfaces or all of two pairs of side end surfaces may be the light incident end surfaces, if necessary. In this case, the LED are arranged to be adjacent so as to face all the light incident end surfaces. In addition, in a case where the light guide shaped article-preform is a laminated light guide shaped article-preform, at least one end surface of the four side end surfaces of the light guide shaped article-preform constituting the laminated light guide shaped article-preform is a light incident surface.

The upper surface of the two principal surfaces substantially perpendicular to the light incident end surface 241 of the light guide article 24 becomes a light emitting surface 242. In addition, in a case where the light guide shaped article-preform is a laminated light guide shaped article-preform, two types of the principal surfaces of the light guide shaped article-preform side and the translucent sheet side are considered to be the principal surfaces of the laminated light guide shaped article-preform. However, in the present invention, any one of the principal surfaces of the light guide shaped article-preform side and the translucent sheet side may become the light emitting surface. In the embodiment, the light emitting surface 242 is composed of a smooth surface (mirror surface), but is not limited thereto. A prism shape, a microlens shape or the like may be provided for the light emitting surface.

In addition, a plurality of the LEDs 22 may be installed. In this case, it is preferable that a plurality of the LEDs 22 be arranged at appropriate intervals in the direction vertical to the paper surface of FIG. 1 so that the directions of the maximum-intensity light beams among the light beams emitted from the LEDs are parallel to each other.

On a principal surface (back surface) 243 at the opposite side of the light emitting surface 242 of the light guide article 24, a light emitting organization is formed. In addition, in the light guide article for the surface light source device according to the present invention, the light emitting organization is not limited to the aforementioned configuration, but the light emitting organization may be formed on the light emitting surface of the light guide article because the light emitting organization may be formed on any surface of the light emitting surface and the back surface. However, in a case where the light guide shaped article-preform is a laminated light guide shaped article-preform, the surface where the light emitting organization is formed is limited to the principal surface of the light guide shaped article-preform side. The light emitting organization is composed of a bubble-containing surface layer 244 which is formed in a partial area of the back surface 243. The bubble-containing surface layer 244 is composed so that there has a concave shape the cross section (longitudinal cross section) including the direction of the normal line of the light emitting surface 242 or the back surface 243.

The area where the bubble-containing surface layer 244 is formed is composed of a plurality of dot-shaped areas of the back surface 243. As the dimensions of the dot-shaped area, for example, the diameter is in a range from 30 to 1,000 μm, and the depth is in a range from 0.1 to 500 μm. In addition, it is preferable that the bubble-containing surface layer 244 have a thickness from 1 to 50 μm.

In addition, the shape of the area where the bubble-containing surface layer 244 is formed is not limited to the dot shape as described above, but it may be a stripe-shaped area, that is, a line-shaped or belt-shaped area. Even in this case, with respect to the shape of the cross section (longitudinal cross section) perpendicular to the extending direction of the stripe, the description of the shape of the cross section (longitudinal cross section) of the above-described case of the dot shape is also applied.

The bubble-containing surface layer 244 may be formed with use of a sheet-shaped present light guide shaped article-preform and performing the laser irradiation processing.

The change in the longitudinal cross section shape (profile) of the bubble-containing surface layer 244 may be implemented with changing laser power, a scanning speed and a focus position with respect to the principal surface of the light guide shaped article-preform in the manufacturing method to be described later.

The bubble-containing surface layer 244 contains a large number of bubbles, and the refractive index of the inside of the bubble is greatly different from the refractive index of the material of the light guide article. Thus, the bubble-containing surface layer 244 functions as a non-uniform layer with respect to transmission and reflection of light and functions as a light diffusing layer with respect to the optical properties. As a result, the light which enters to the light incident end surface 241 and is guided into the light guide article is diffused and reflected in the bubble-containing surface layer 244, and a portion of the light is directed toward the light emitting surface 242 at an allowable angle of emission from the light emitting surface 242 and is emitted from the light emitting surface 242.

Since the bubble-containing surface layer 244 is formed in a partial area of the back surface 243 of the light guide article, the light having a slight broad directionality in the distribution of the inner portion of the surface including both of the normal direction (up/down direction in FIGS. 1 and 2) of the light emitting surface 242 and the direction perpendicular to the light incident end surface 241 is emitted from the light emitting surface 242.

The function of the bubble-containing surface layer 244 depends on the state of foaming of the bubble-containing surface layer 244. When too small bubbles are formed, or when the number of bubbles per unit area is too low, it is difficult to obtain a good light diffusing function.

A plurality of the area of the bubble-containing surface layer 244 may be arranged on the back surface 243. In a case where the area of the bubble-containing surface layer 244 has a dot shape, the distribution thereof may be, for example, a random pattern, a checkerboard pattern, a zigzag pattern or a closest packed pattern. In a case where the area of the bubble-containing surface layer 244 has a stripe shape, the distribution thereof may be, for example, a parallel stripe pattern.

In addition, the bubble-containing surface layer 244 of the back surface 243 is formed in a partial area. However, the light guide article for the surface light source device according to the present invention is not limited thereto, but in some cases, the bubble-containing surface layer may be formed in a partial area or the entire area of the light emitting surface or in the entire area of the back surface. However, in a case where the light guide shaped article-preform is a laminated light guide shaped article-preform, the bubble-containing surface layer is formed in a partial area or the entire area of the principal surface of the light guide shaped article-preform side because the surface where the light emitting organization is formed is limited to the principal surface of the light guide shaped article-preform side.

In addition, as the light emitting organization of the light guide article 24, it may be used a light emitting organization formed with mixing and dispersing light diffusing fine particles in the inner portion of the light guide article 24 in combination with the bubble-containing surface layer 244 formed on the above-described back surface 243. In addition, a shape such as a prism row or a cylindrical lens row may be provided on the light emitting surface 242 or the back surface 243.

In addition, as the light guide article 24, it may be used light guide articles having various cross sectional shapes such as a wedge-shaped light guide article of which thickness is gradually decreased from the light incident end surface 241 towards the opposite end surface besides the sheet-shaped light guide article having an overall uniform thickness (thickness in the case of neglecting the concave shape of the bubble-containing surface layer 244 on the back surface 243) as illustrated in FIGS. 1 and 2.

The thickness of the light guide article 24 is in a range from 0.3 to 30 mm, for example.

The light diffusing element 26 is arranged on the light emitting surface 242 of the light guide article 24 and is composed of, for example, a light diffusing film. In a case where the directionality of the light emitted from the light emitting surface 242 has a desired emission angle and viewing angle, the light diffusing element 26 may be omitted.

The first light deflecting element 28 is arranged on the light diffusing element 26, and the second light deflecting element 30 is arranged on the first light deflecting element 28. Namely, the light diffusing element 26 is interposed between the first light deflecting element 28 and the light emitting surface 242 of the light guide article.

Each of the first light deflecting element 28 and the second light deflecting element 30 has an light incident surface at the side close to the light guide article 24 and a light emitting surface at the side opposite to the light incident surface, and the light emitting surface has a plurality of prism rows which are arranged to be parallel to each other. Herein, the first light deflecting element 28 and the second light deflecting element 30 are arranged so that the extension directions of the prism rows of the light emitting surfaces are perpendicular to each other.

In the embodiment, the extension direction of the prism rows of the light emitting surface of the first light deflecting element 28 is parallel to the light incident end surface 241, and the extension direction of the prism rows of the light emitting surface of the second light deflecting element 30 is vertical to the light incident end surface 241. However, the present invention is not limited thereto. Both of the extension direction of the prism rows of the light emitting surface of the first light deflecting element 28 and the extension direction of the prism rows of the light emitting surface of the second light deflecting element 30 may be inclined with respect to the light incident end surface 241 and be perpendicular to each other.

The thickness of each of the first light deflecting element 28 and the second light deflecting element 30 is in a range from 30 to 350 µm, for example.

In a case where the light emitted from the light emitting surface 242 has a peak of distribution in a required direction, the first light deflecting element 28 and the second light deflecting element 30 may be omitted. In addition, in a case where the angular distribution of the light emitted from the light emitting surface 242 or the light emitted from the light diffusing element 26 is able to be used for a required application (for example, a signboard) without requiring light deflection, the first light deflecting element 28 or the second light deflecting element 30 may be omitted.

As the light reflecting element 32, for example, it may be used a plastic sheet (light reflecting sheet) having a metal-deposited reflecting layer on the surface thereof. In addition, it is preferable that a reflecting member be also provided to other end surfaces besides the end surface used as the light incident end surface of the light guide article 24. In a case where the amount of the light emitted from the back surface 243 is negligibly small, the light reflecting element 32 may be omitted.

A liquid crystal display apparatus is composed with arranging liquid crystal display elements on the light emitting surface (light emitting surface of the second light deflecting element 30) of the surface light source device which is composed with the LEDs 22, the light guide article 24, the light diffusing element 26, the first light deflecting element 28, the second light deflecting element 30 and the light reflecting element 32 described heretofore. The liquid crystal display apparatus is observed by an observer from the upper side of FIG. 1 through the liquid crystal display elements.

In addition, a second light diffusing element is arranged to be adjacent to the light emitting surface of the second light deflecting element 30 to suppress glare, luminance spots or the like which causes deterioration in quality of image display, so that it is possible to improve the quality of the image display.

EXAMPLES

The present invention will be described more in detail with use of the following Examples. In addition, hereinafter, various evaluations were performed with use of the following methods.

<Measurement of Mass Average Molecular Weight>

The mass average molecular mass of a resin was obtained with the following measurement.

It was added 10 mg of the resin to 10 mL of tetrahydrofuran (THF) and dissolved at a standstill for one night so that a THF solution of the resin was obtained. Next, measurement was performed for the THF solution of the resin as a sample with using liquid chromatography (HLC-8120 (product name) produced by TOSOH CORPORATION).

During the measurement, a column of TSK guard column Super H-H produced by TOSOH CORPORATION was used for a guard column; and a series of two columns of TSK-Gel Super HM-H produced by TOSOH CORPORATION was used for a separation column. The used solvent was THF; the flow rate was 0.6 mL/min; the detector was a differential refractometer; the measurement temperature was 40° C.; and the injection amount was 10 µL. As the standard polymer, polystyrene was used.

<Measurement of Thermal Mass Reduction Temperature of Resin Composition>

For measurement of the thermal mass reduction temperature of a resin composition, it was used a differential thermogravimetric mass simultaneous measurement apparatus (TG/DTA: TG8120 (product name) produced by Rigaku Corporation). The sample mass was 5 mg, and in order to eliminate the influence of low-temperature volatile components, heating up to 100° C. at a temperature rising rate of 20° C./min was performed, and after that, retaining was performed for 10 minutes. Next, mass reduction was measured while heating up to 650° C. at a temperature rising rate of 5° C./min. The temperatures where the mass reduction rate became 20%, 30% and 40% with use of the mass after retaining at 100° C. for 10 minutes as a reference were defined as the 20%, 30% and 40% thermal mass reduction temperatures, respectively. In addition, all the measurements were performed under the air atmosphere.

<Peak Temperature of the Component of m/z of 100 and Half Extent Temperature of the Peak>

Mass spectrometry was performed for a resin composition under the following conditions with use of a differential thermal balance-photoionization mass spectrometry simultaneous measurement system "Thermo Mass Photo (product name)" produced by Rigaku Corporation.

An empty aluminum cup was disposed at the reference side of a balance in a sample chamber, and an aluminum cup filled with 7 mg of a specimen piece of a resin composition was disposed at the measurement sample side.

A pseudo air which is a mixture gas containing 80 mass % of helium and 20 mass % of oxygen was allowed to pass through the measurement equipment at 300 mL/min, and after a change in mass was not acknowledged, the measurement was started.

While it was raised the temperature under the pseudo air stream at a rate of 5° C./min from the state of 40° C., measurement of the peak temperature of the component of m/z of 100 and the half extent temperature of the peak with respect to the component of mass-to-charge ratio m/z of 100 in a generating decomposition product gas was performed. For ionization of the decomposition product gas, a photoionization method was used.

<Measurement of 90% Thermal Mass Reduction Temperature of Silicone Compound>

For measurement of the 90% thermal mass reduction temperature of the silicone compound, a differential thermogravimetric mass simultaneous measurement apparatus (TG/DTA: TG8120 (product name) produced by Rigaku Corporation) was used. It was used 5 mg of a sample. The sample was heated up to 100° C. at a temperature rising rate of 20° C./min in order to eliminate the influence of low-temperature volatile components, and after that, retaining was performed for 10 minutes. Next, mass reduction was measured while the sample was heated up to 650° C. at a temperature rising rate of 5° C./min. The temperature where the mass reduction rate becomes 90% was defined as the 90% thermal mass reduction temperature with use of the mass after retaining at 100° C. for 10 minutes as a reference. In addition, all the measurements were performed under the nitrogen atmosphere.

<State of Foamed Layer>

A laser processing was performed on the surface of a resin shaped-article with irradiation of a carbon dioxide laser (ML-Z9520T (product name) (wavelength: 9.3 μm, average power: 20 W) produced by Keyence Corporation). Next, states of front and side surfaces of the laser-processed site were observed with use of an electron microscope and existence/non-existence of the foamed layer was visually evaluated according to the following criteria.

○: A large number of voids were recognized at the laser-processed site.

x: Slight number of voids or no voids were recognized at the laser-processed site.

<Evaluation of Luminance Distribution>

Figure 3:
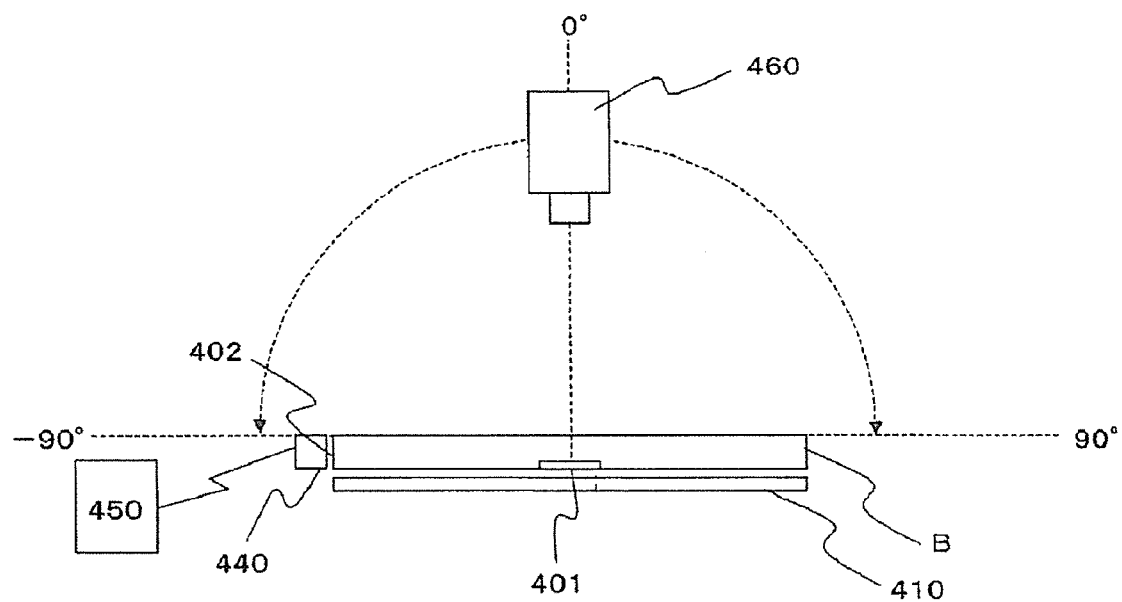
FIG. 3 shows a diagram for explaining a method of evaluating optical characteristics of the surface light source device.

FIG. 3 shows a diagram for explaining a method of evaluating optical characteristics of the surface light source device and illustrates a schematic diagram of an example of a measurement apparatus used for evaluation of luminance distribution. The luminance distribution of the surface light source device composed with use of a light guide article for an surface light source device B was evaluated with the aforementioned measurement apparatus and the following method.

An LED light source 440 (one lamp of LED NS2W123B (product name) produced by Nichia Corporation) which emitted light at 20 mA with a constant-current power supply 450 was arranged on a light incident end surface 402 of the light guide article B for the surface light source device as a measurement target, and a reflecting sheet 410 (UX (product name) having a thickness of 225 μm produced by Teijin DuPont Films Japan Limited) was arranged on the back surface (the lower surface in FIG. 3) of the opposite side of the light emitting surface (the upper surface in FIG. 3).

With use of a luminance meter 460 (BM-7 (product name) produced by TOPCON Corporation), it was measured the luminance distribution, in the range of the emitting light angle from −90 degrees to 90 degrees in the surface vertical to the light emitting surface of the light guide article in parallel to the light guiding direction (the left/right direction in FIG. 3) in the light guide article for the surface light source device B, for the light emitted from the light emitting surface of the area of the viewing angle of 2 degrees about the portion as a center where the light emitting organization 401 was arranged.

With respect to the light emitting direction, the normal direction of the light emitting surface was set to 0 degrees; the direction of the light incident end surface 402 as viewed from the light emitting organization 401 was set to −(minus) degrees; and the opposite direction was set to +(plus) degrees. A half angular width (degrees) of the luminance distribution was obtained based on the measurement result.

<Evaluation of Emission Quality>

Emission quality of the surface light source device composed with use of the light guide article B for the surface light source device was evaluated under the following conditions with use of the measurement apparatus illustrated in FIG. 3 and with the following method.

The LED light source 440 (one lamp of LED NS2W123B (product name) produced by Nichia Corporation) which emitted light at 20 mA with the constant-current power supply 450 was arranged on the light incident end surface 402 of the light guide article B for the surface light source device as a measurement target, and the reflecting sheet 410 (UX (product name) having a thickness of 225 μm produced by Teijin DuPont Films Japan Limited) was arranged on the back surface of the opposite side of the light emitting surface.

In addition, although not illustrated in FIG. 3, as illustrated in FIG. 1, a diffusing sheet (26) as a light diffusing element and prism sheets (28 and 30) as first and second light deflecting elements are arranged to be adjacent to a light emitting surface (242) of the light guide article. The prism sheets were arranged in the direction where the prism-row formed surface was directed toward the opposite side (upward) of the light emitting surface (242) of the light guide article B (24) for the surface light source device. Namely, each of the prism sheets (28 and 30) has a light incident surface at the side close to the light guide article B (24) for the area light source device and a light emitting surface at the side opposite to the light incident surface, and the light emitting surface is composed with a plurality of prism rows. As the diffusing sheet (26), a high-luminance diffusion film for LCD backlight (Light Up 100 GM3 (product name)) produced by Kimoto Co., Ltd. was used; and as the prism sheets (28 and 30), a luminance enhancement film (Vikuiti BEFII90/50 (product name)) produced by Sumimoto 3M ltd. was used. The first prism sheet (28) was arranged so that the prism row and the light incident end surface 402 (241) of the light guide article are parallel to each other, and the second prism sheet (30) was arranged so that the light guiding directions in the prism row and the light guide article are parallel to each other (namely, the prism row and the light incident end surface 402 (241) of the light guide article were vertical to each other).

Similarly to the above-described evaluation of the luminance distribution, emission quality was evaluated with allowing the LED light source 440 to emit light and visually identifying whether or not dots of concave portions formed with the laser etching process are visually recognizable.

x: Dots were visually recognizable.

○: Dots were not visually recognizable, and good surface emission was obtained.

Example 1

A pellet mixed with an additive was obtained with adding 500 ppm by mass of polydimethylsiloxane SH200C FLUID 100CS produced by Dow Corning Toray Co., Ltd. as a thermal decomposition accelerator to a methacrylic resin pellet (ACRYPET VH000 (product name) produced by Mitsubishi Rayon Co., Ltd., Mw: 86,000, 90 mass % or more of methyl methacrylate units) and, after that, with stirring at a stirring blade rotation speed of 1,000 rpm for 30 seconds by using super mixer SMV-20 (product name) produced by Kawata MFG Co., Ltd. Furthermore, the resin composition was obtained with use of the pellet mixed with an additive and performing compounding with a twin-screw extruder PCM45 (product name) produced by Ikegai Metal Co., Ltd. As compound conditions, a temperature condition C1 was set to 180° C., C2 was set to 235° C., C3 was set to 235° C., C4 was set to 235° C., C5 was set to 235° C., C6 was set to 240° C., AD was set to 245° C., and D was set to 245° C., during the extrusion. In addition, an ejection amount was set to 60 kg/hour, a screw rotation speed was set to 200 rpm, a feeder rotation speed was set to 45 rpm, and a vent vacuum pressure was set to −95 kPa or less. After the extruded strand was cooled in a water bath at a water temperature of 55° C., pelletization was performed with use of an SCF-150 type pelletizer (product name) produced by Isuzu Kakoki Co., Ltd., so that a resin composition was obtained.

Next, after drying of the resulting resin composition was performed with an SBD-150 AS type dehumidification drier at a temperature of 80° C. for 24 hours, the injection molding was performed with use of AUTOSHOT T Model 100D (product name) produced by FANUC Corp., so that a resin shaped-article having a width of 100 mm, a length of 100 mm and a thickness of 3 mm was manufactured. A temperature of the mold at this time was set to 60° C., and as the temperatures of the cylinder, C1 was set to 250° C., C2 was set to 250° C., C3 was set to 250° C., and C4 was set to 250° C. In addition, an injection speed was set to 20 mm/sec, an injection pressure (holding pressure) was set to 70 MPa, a holding pressure time was set to 20 seconds, measuring was set to 30 mm, a cooling time was set to 30 seconds, and a cooling cycle was set to 45 seconds.

In a case where a laser etching process was performed in the state that distortion remained in the molding period, thermal relaxation of the distortion remained in the molding period occurred due to the heat in the laser processing period, so that the etching shape was not stabilized. Actually, when the edge lighting was performed, unevenness of luminance easily occurred. Therefore, an annealed molding product was obtained after an annealing process was performed to eliminate the distortion in the molding period of the resulting molding product. As annealing conditions, the upper and lower surfaces of the molding product was interposed with use of two stainless steel sheets having external dimensions of 100 mm×100 mm, internal dimensions of 80 mm ×80 mm and a thickness of 3 mm, and furthermore, the peripheries of the stainless steel sheets were interposed and fixed with clips. After that, heating was performed in a hot air dryer at 120° C. for 16 hours, and furthermore, heating was performed at 130° C. for 16 hours.

The peripheral portion interposed with the stainless steel sheets having 100 mm ×100 mm of the resulting annealed molding product was cut into a light guide shaped article-preform having 80 mm×80 mm×thickness 3 mm. The evaluation result obtained with use of the resulting light guide shaped article-preform obtained above is listed in Table 1.

Figure 4A:
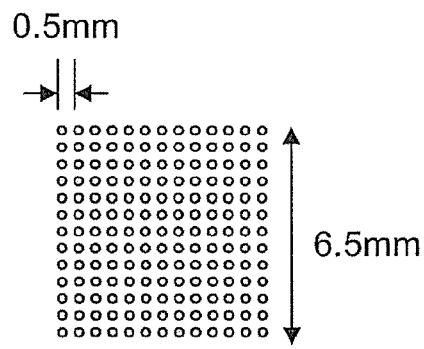
FIG. 4(a) shows an enlarged diagram illustrating a light emitting organization of a sample of the light guide article for a surface light source device.
Figure 4B:
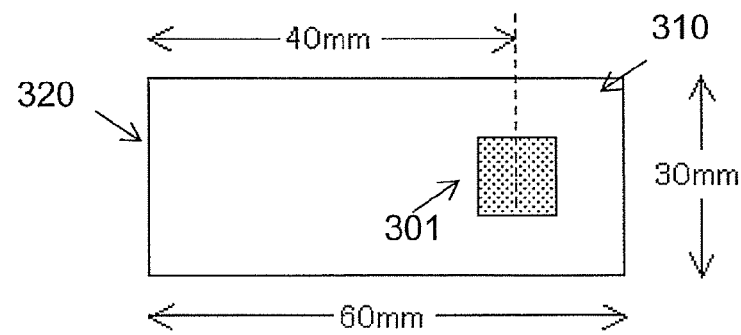
FIG. 4(b) shows a front diagram illustrating the sample of the light guide article for a surface light source device and FIG. 4(c) shows a side diagram illustrating the sample of the light guide article for a surface light source device.

A specimen piece having 60 mm×30 mm was cut from the above-described light guide shaped article-preform as illustrated FIG. 4(b).

Figure 4C:
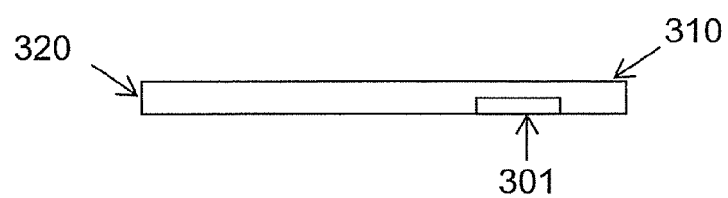

Next, a laser irradiation process was performed on the surface (surface at the side opposite to a light emitting surface) facing a light emitting surface 310 of a specimen piece with a 80% power at a scan speed of 500 mm/sec with use of a carbon dioxide laser (ML-Z9520T (product name) produced by Keyence Corporation (wavelength: 9.3 μm, average power: 20 W)) in the condition that a laser focus position was aligned with the surface of the resin shaped-article, so that a light guide article having a light emitting organization 301 illustrated in FIG. 4(b) or 4(c) was obtained. The evaluation results of the light guide body are listed in Table 1.

In addition, as illustrated in an enlarged diagram of FIG. 4(a), it was used a pattern where 13 dot shapes were arranged at a pitch of 0.5 mm in the direction parallel to the light incident end surface, for the pattern formed with the laser irradiation processing. In addition, the site where the laser irradiation processing was performed was defined with an area having 6.5 mm×6.5 mm of which center was located at=the position with a distance of 40 mm from the light incident end surface 320 and a distance of 15 mm from the side end surface of the specimen piece. In addition, a light blocking process using black ink application was performed on the end surface at the side opposite to the light incident end surface.

Example 2

A pellet mixed with an additive was obtained with adding 100 ppm by mass of polydimethylsiloxane SH200C FLUID 100CS produced by Dow Corning Toray Co., Ltd. as a thermal decomposition accelerator to a methacrylic resin pellet (ACRYPET VH000 (product name) produced by Mitsubishi Rayon Co., Ltd., Mw: 86,000, 90 mass % or more of methyl methacrylate units) and, after that, with stirring at a stirring blade rotation speed of 1,000 rpm for 30 seconds with use of super mixer SMV-20 (product name) produced by Kawata MFG Co., Ltd.

With use of the resulting pellet mixed with an additive, a resin shaped-article was obtained with the same method as Example 1.

A sheet (present light guide shaped article-preform) having a thickness of 120 μm was prepared with cutting a portion of a thickness 120 μm from the surface of the resulting resin shaped-article with use of an end mill (produced by Union Tool Co., Ltd., carbide end mill CPR2060-12 (product name)). In addition, it was prepared a resin shaped-article (transparent sheet) obtained with injection molding by the same method as Example 1, which was obtained with use of methacrylic resin pellet (ACRYPET VH000 (product name) produced by Mitsubishi Rayon Co., Ltd., Mw: 86,000, 90 mass % or more of methyl methacrylate units). Next, 100 mm×100 mm×thickness 3.1 mm of a laminated light guide shaped article-preform (thickness of the present light guide shaped article-preform is 120 μm) was obtained with performing thermal pressing on the resulting resin shaped-article under the condition with 130° C. and loading of 1 ton, for 30 seconds using AH-2003 (product name) produced by AS ONE Corp.

Laser processing was performed with the same method as Example 1 on a layer (present light guide shaped article-preform) containing the acrylic resin composition comprising a thermal decomposition accelerator of the resulting laminated light guide shaped article-preform, and the state of a foamed layer was evaluated with observation by a microscope. The result is listed in Table 1.

Comparative Example 1

A resin shaped-article and a light guide article were obtained in the same manner as Example 1 except for use of a methacrylic resin pellet (ACRYPET VH000 (product name) produced by Mitsubishi Rayon Co., Ltd., Mw: 86,000, 90 mass % or more of methyl methacrylate units) instead of the resin composition pellet comprised with a methacrylic resin and the thermal decomposition accelerator. The evaluation result is listed in Table 1.

Comparative Example 2

An acrylic cast sheet (Acrylite L000 (product name) produced by Mitsubishi Rayon Co., Ltd., thickness: 4 mm, mass average molecular mass: 610,000, 90 mass % or more of methyl methacrylate units) was ground, and injection molding was performed with the same method as Example 1. However, the molecular mass was high and liquidity was poor, so that a sheet-shaped article was not able to be obtained.

As clear from the evaluation result of Table 1, it can be understood that the surface-foamed layer is formed with the laser irradiation processing when it was used the light guide shaped article-preform having the resin composition, which has a resin having a mass average molecular mass of 60,000 to 150,000 and has a 30% thermal mass reduction temperature of 310° C. or lower, a difference between a 40% thermal mass reduction temperature and a 20% thermal mass reduction temperature of 7° C. or lower, on the surface of the light guide shaped article-preform, so that it is possible to form a pattern having a good light scattering property. However, in the resin shaped-article obtained with deviation from the above-described conditions, voids were slightly observed or not observed at the laser-processed site, and any pattern having a good light diffusing property was not obtained.

(ACRYPET VH000 (product name) produced by Mitsubishi Rayon Co., Ltd., Mw: 86,000, 90 mass % or more of methyl methacrylate units) so as to have the concentrations listed in Table 2, and resin compositions were obtained by the same method as Example 1.

After injection molding were performed on the resulting resin compositions with the same method as Example 1, annealing was performed on each Examples, so that light guide shaped article-preforms were obtained. Laser processing was performed on each of the resulting light guide shaped article-preform with the same method as Example 1, so that light guide articles were obtained.

TABLE 1

|  |  | Example 1 | Example 2 | Comparative Example 1 | Comparative Example 2 |
|---|---|---|---|---|---|
| Resin | Mw | 86,000 | 86,000 | 86,000 | 610,000 |
|  | Injection Moldability *1 | ◯ | ◯ | ◯ | X |
| Resin Composition | 30% Thermal Mass Reduction Temperature [° C.] | 299 | 301 | 311 | — |
|  | difference between 40% Thermal Mass Reduction Temperature and 20% Thermal Mass Reduction Temperature [° C.] | 2.8 | 3.1 | 8.0 | — |
|  | Peak Temperature of Maximum Peak of the component of m/z of 100 [° C.] | 297 | 300 | 316 | — |
|  | Half Extent Temperature of the Peak [° C.] | 23 | 26 | 44 | — |
| light guide article | State of Foamed Layer | ◯ | ◯ | X | — |
|  | Half Angular Width of Luminance Distribution [°] | 101 | — | 45 | — |
|  | Thickness of Bubble-Containing Surface Layer [μm] | 10 to 20 | 5 to 10 | 0 | — |

*1 relates to the evaluation of injection moldability, "◯" denotes the case where the injection molding is applicable, and "x" denotes the case where the injection molding is unapplicable.

Examples 3 to 8 and Comparative Examples 3 and 4

Silicone compounds as thermal decomposition accelerators listed in Table 2 were added to methacrylic resin pellets In Examples 3 to 8 and Comparative Examples 3 and 4, there are listed in Table 2 the types, addition amounts (concentrations (mass basis)) and 90% thermal mass reduction temperatures of the added silicone compounds, the thickness of the bubble-containing surface layers and the half angular widths of the luminance distributions of the resulting light guide articles B for the surface light source devices, and the evaluation results of emission quality of the surface light source devices.

TABLE 2

|  | Example 3 | Example 4 | Example 5 | Example 6 | Example 7 | Example 8 | Comparative Example 3 | Comparative Example 4 |
|---|---|---|---|---|---|---|---|---|
| Type of Silicone Compound | A | B | C | D | E | E | None | F |
| Mw of Resin | 86,000 | 86,000 | 86,000 | 86,000 | 86,000 | 86,000 | 86,000 | 86,000 |
| Concentration [ppm by mass] of Silicone Compound | 100 | 100 | 100 | 100 | 100 | 500 | 0 | 100 |
| 90% Thermal Mass Reduction Temperature [° C.] of Silicone Compound | 353 | 438 | 500 | 542 | 534 | 534 | — | 246 |
| Thickness [μm] of Bubble-Containing Surface Layer | 10.50 | 10.60 | 9.60 | 23.00 | 9.60 | 14.90 | None | None |
| Half Angular Width [°] of Luminance Distribution of Light guide article | 81 | 124 | 121 | 125 | 86 | 123 | 43 | 46 |

TABLE 2-continued

| | Example 3 | Example 4 | Example 5 | Example 6 | Example 7 | Example 8 | Comparative Example 3 | Comparative Example 4 |
|---|---|---|---|---|---|---|---|---|
| Evaluation of Emission Quality of Surface Light Source Device | ○ | ○ | ○ | ○ | ○ | ○ | X | X |

In addition, the types A to F of the silicone compounds listed in Table 2 are as follows.

A: polydimethylsiloxane KF96A-10CS produced by Shin-Etsu Chemical Co., Ltd.

B: polydimethylsiloxane KF96A-20CS produced by Shin-Etsu Chemical Co., Ltd.

C: polydimethylsiloxane KF96A-30CS produced by Shin-Etsu Chemical Co., Ltd.

D: polydimethylsiloxane KF96A-50CS produced by Shin-Etsu Chemical Co., Ltd.

E: polydimethylsiloxane SH200C FLUID 100CS produced by Dow Corning Toray Co., Ltd.

F: polydimethylsiloxane KF96A-6CS produced by Shin-Etsu Chemical Co., Ltd.

Figure 5:
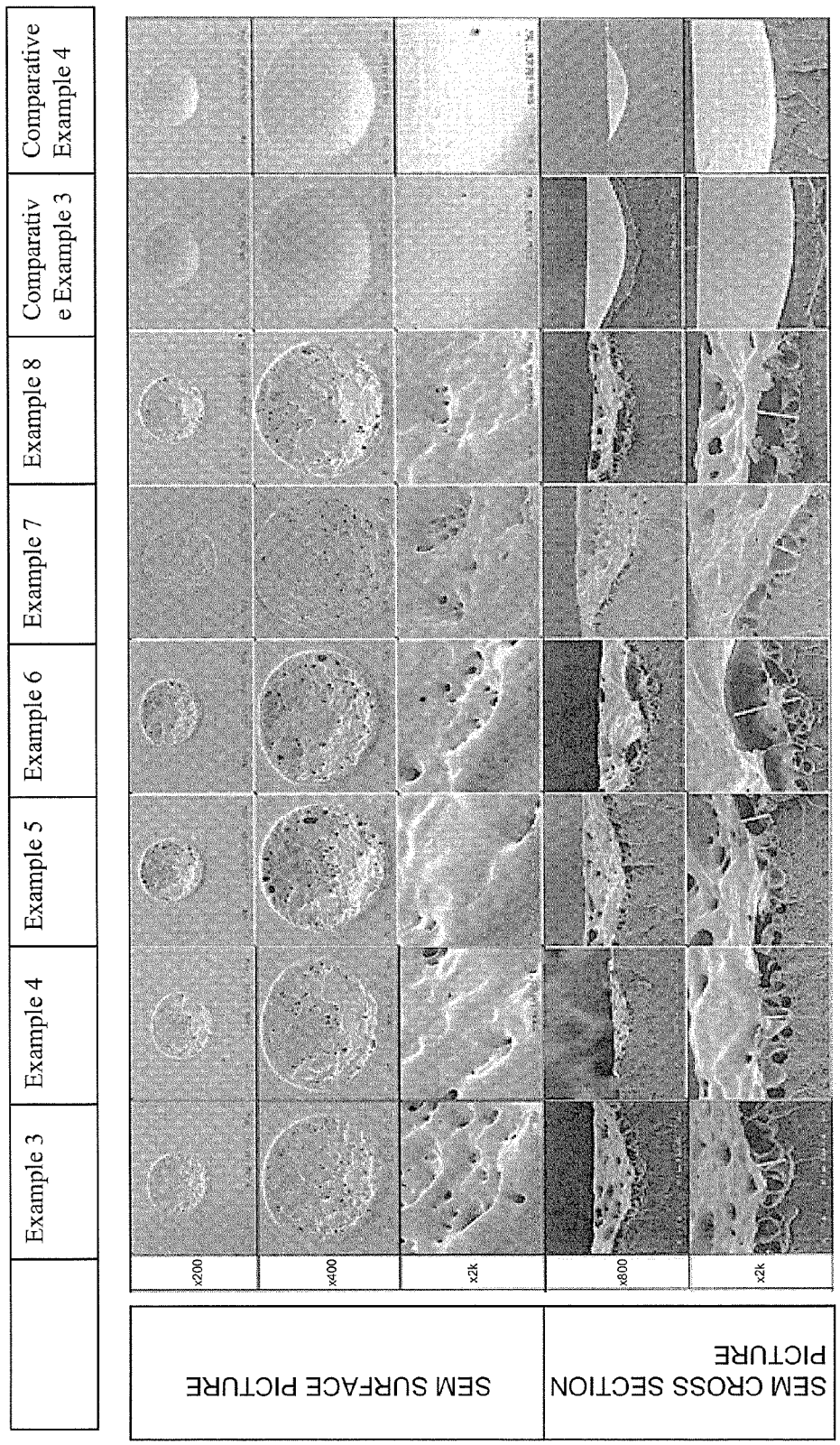
FIG. 5 shows SEM plan diagrams and SEM cross-sectional diagrams illustrating bubble-containing surface layers or concave portions which become the light emitting organizations of the light guide articles for the surface light source device obtained in Examples 3 to 8 and Comparative Examples 3 and 4.

Observation results (SEM pictures) of the surfaces of the concave portions and the cross sections of the light guide articles B for the light guide article are illustrated in FIG. 5.

As illustrated in FIG. 5, in the light guide articles for surface light source devices according to Examples 3 to 8 using a silicone compounds having a 90% thermal decomposition temperature of 250° C. or higher to 650° C. or lower in the thermal mass reduction (TG/DTA) measurements, concave-convexes having a size of the order of several micrometers are observed on the surfaces of the portions of the light emitting organization which is formed in a recessed state on the principal surface of the light guide article by laser etching, so that it can be understood that a plurality of bubbles are localized in the vicinities of the inclined surfaces on the cross sections. Namely, the bubble-containing surface layers have crack-shaped microstructures, depressed-hole-shaped microstructures, or cavity-including shaped microstructures, and the bubbles are contained in the aforementioned microstructures.

On the other hand, in the light guide article for a surface light source device according to Comparative Example 3 where no silicone compound is added and in the light guide article for a surface light source device according to Comparative Example 4 where a silicone compound having a 90% thermal decomposition temperature of lower than 250° C. in the thermal mass reduction (TG/DTA) measurement is used, it can be understood that the bubbles are not observed at the cross section and the bubble-containing surface layer is not formed, although fine concave-convex portions are observed on the surface of the concave portion.

As listed in Table 2, the light guide articles for surface light source devices according to Examples 3 to 8 which have the bubble-containing surface layers on the surfaces of the concave portions have characteristics of broad luminance distributions having broad half angular widths. Therefore, in cases where the surface light source devices are composed in combination with optical elements, dots of concave portions corresponding to the bubble-containing surface layers are hard to be visually recognized, and thus, it is possible to obtain high-quality emission.

On the contrary, in the light guide articles for surface light source devices according to Comparative Examples 3 and 4 where the bubble-containing surface layer is not provided on the surfaces of the concave portions, the half angular widths are significantly narrow, and only the emission patterns having strong directionality may be obtained. Therefore, in cases where the surface light source devices are composed in combination with optical elements similarly to the cases of the light guide articles for surface light source devices according to Examples 3 to 8, the dots of the concave portions are easy to be visually recognized, and thus, it may not be possible to obtain high-quality emission. In order to obtain high emission quality with improving the dot transparency, the dots of the concave portions need to be formed more finely with higher densities. As results, the laser etching processes take long times, which lead to decreases in productivity.

From the results heretofore, with use of the resin compositions for light guide shaped article-preforms, the light guide shaped article-preforms, the laminated light guide shaped article-preforms, and the light guide articles for surface light source devices according to the present invention, it is possible to easily obtain the light emitting organizations having highly-efficient light diffusing functions, so that it is possible to easily obtain high-quality surface light source devices.

The invention claimed is:

1. A resin composition for a light guide shaped article-preform containing a resin having a mass average molecular mass of 60,000 to 150,000, and having a 30% thermal mass reduction temperature of 310° C. or lower and a difference of 7° C. or lower between a 40% thermal mass reduction temperature and a 20% thermal mass reduction temperature when thermal mass measurement is performed at a temperature rising rate of 5° C/min from the state of 100° C. under air.

2. The resin composition for a light guide shaped article-preform according to claim 1, wherein a peak temperature of a maximum peak among peaks, representing a mass-to-charge ratio m/z of 100, is 310° C. or lower, and a half extent temperature of the peak of the maximum peak is 25° C. or lower, when mass spectrometry is performed with an ionization method using light energy for a material being generated at the time of heating at a temperature rising rate of 5° C/min from the state of 40° C. under a pseudo air stream containing 80 mass % of helium and 20 mass % of oxygen.

3. The resin composition for a light guide shaped article-preform according to claim 1, wherein the resin is a polymer containing 30 to 100 mass % of methyl methacrylate units and 0 to 70 mass % of other monomer units.

4. A light guide shaped article-preform which is a sheet obtained from the resin composition for a light guide shaped article-preform according to claim 1.

5. A laminated light guide shaped article-preform which is a laminate obtained with lamination of the light guide shaped article-preform according to claim 4 on a different translucent sheet.

6. A light guide article for a surface light source device, in which at least one end surface of the light guide shaped article-preform constituting the laminated light guide shaped article-preform according to claim 5 is used as a light incident end surface and a principal surface of the light guide shaped article-preform side or a principal surface of the translucent sheet side among two principal surfaces of the laminated light guide shaped article-preform is used as a light emitting surface, wherein a bubble-containing surface layer is formed on a partial area or the entire area of the principal surface of the light guide shaped article-preform side.

7. The light guide shaped article-preform according to claim 4 which is a sheet obtained with shaping by extrusion molding or injection molding using the resin composition for the light guide shaped article-preform.

8. The laminated light guide shaped article-preform according to claim 5, wherein the light guide shaped article-preform is a sheet obtained with shaping by extrusion molding or injection molding using the resin composition for the light guide shaped article-preform.

9. A light guide article for a surface light source device, in which at least one end surface of the light guide shaped article-preform according to claim 4 is used as a light-incident end-surface, the one of two principal surfaces of the light guide shaped article-preform is used as a light emitting surface and the other principal surface is used as a back surface, wherein a bubble-containing surface layer is formed on a partial area or the entire area of the light emitting surface or the back surface.

10. The light guide article for a surface light source device according to claim 9, wherein a thickness of the surface layer is in a range from 1 to 50 µm.

11. The light guide article for a surface light source device according to claim 9, wherein the surface layer has a concave shape in a cross section including the normal direction of the light emitting surface or the back surface.

12. The light guide article for a surface light source device according to claim 9, wherein the surface layer is formed with a laser irradiation processing.

13. The light guide article for a surface light source device according to claim 12, wherein a laser used for the laser irradiation processing is an infrared laser.

14. The light guide article for a surface light source device according to claim 13, wherein the infrared laser is a carbon dioxide laser.

15. A surface light source device in which a primary light source is arranged to be adjacent to the light incident end surface of the light guide article for a surface light source device according to claim 9.

16. A resin composition for a light guide shaped article-preform containing a resin having a mass average molecular mass of 60,000 to 150,000, and a silicone compound having a 90% thermal mass reduction temperature of 250° C. or higher and 650° C. or lower when thermal mass measurement is performed at a temperature rising rate of 5° C./min from the state of 100° C. under nitrogen.

17. The resin composition for a light guide shaped article-preform according to claim 16, wherein the silicone compound is dimethyl silicone oil.

\* \* \* \* \*